United States Patent [19]

Guss

[11] Patent Number: 5,051,874
[45] Date of Patent: Sep. 24, 1991

[54] LIGHTING SYSTEM FOR GRAIN AUGER

[76] Inventor: Mitchell E. Guss, RR 1, Box 120, Willow City, N. Dak. 58384

[21] Appl. No.: 562,279

[22] Filed: Aug. 3, 1990

[51] Int. Cl.⁵ .............................................. F21V 33/00
[52] U.S. Cl. ..................................... 362/89; 362/250; 362/396; 362/431
[58] Field of Search ...................... 198/318, 319, 320; 362/89, 250, 253, 370, 371, 396, 431

[56] References Cited

U.S. PATENT DOCUMENTS

| | | | |
|---|---|---|---|
| 3,189,168 | 6/1965 | Coats et al. | 198/657 X |
| 3,559,816 | 2/1971 | Hirata | 362/84 X |
| 4,190,881 | 2/1980 | Drost et al. | 362/431 X |
| 4,236,194 | 11/1980 | Norman | 362/89 X |

FOREIGN PATENT DOCUMENTS 1203708  6/1964  Fed. Rep. of Germany ........ 362/84

Primary Examiner—Stephen F. Husar
Attorney, Agent, or Firm—Fleit, Jacobson, Cohn, Price, Holman & Stern

[57] ABSTRACT

A lighting system for a grain auger which enables grain bins to be loaded at night including a light bar mounted on an elongated grain elevator or auger in spaced relation to the grain bin being loaded and in spaced relation to the hopper end of the grain auger which receives grain from a grain conveying body mounted on a vehicle. The light bar includes separate light units to illuminate the grain bin and the hopper end of the auger for effectively illuminating the work area associated with a grain storage bin or grain drying bin and the hopper end. The light units are adjustable for optimum positioning in relation to the work area with the adjustment of the light units also enabling the light to be directed to the open cover at the top of the bin or at the ladder on the side of the bin. The light bar is mounted by a split clamp having cushioning material on the interior thereof to enable the light bar to be clamped to the grain auger housing without damage and in a secure and adjustable manner. The light units are standard halogen lights powered by the battery of a tractor or other suitable DC power source with the electrical conductors supplying electrical energy to the lights being positioned along the bottom surface of the grain auger.

13 Claims, 2 Drawing Sheets

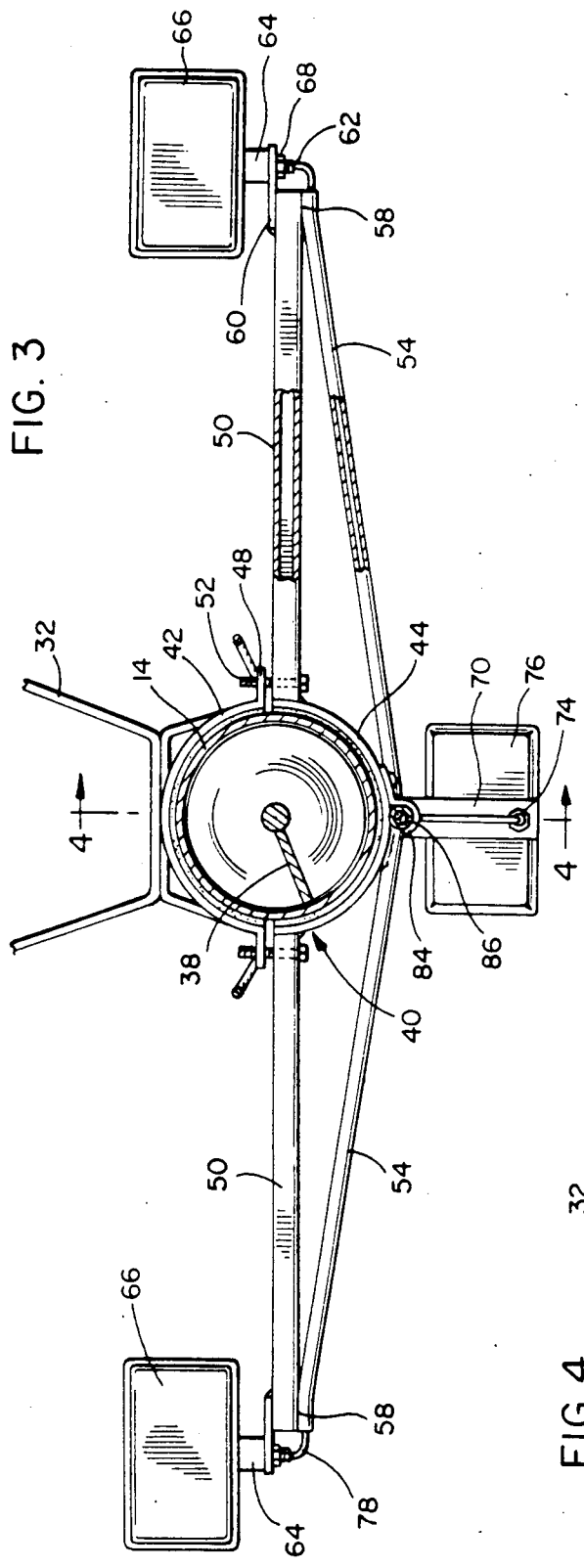
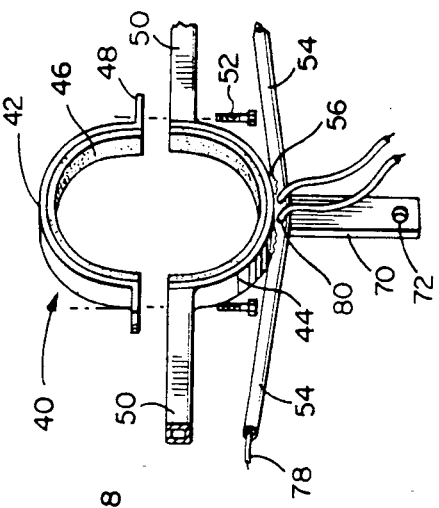
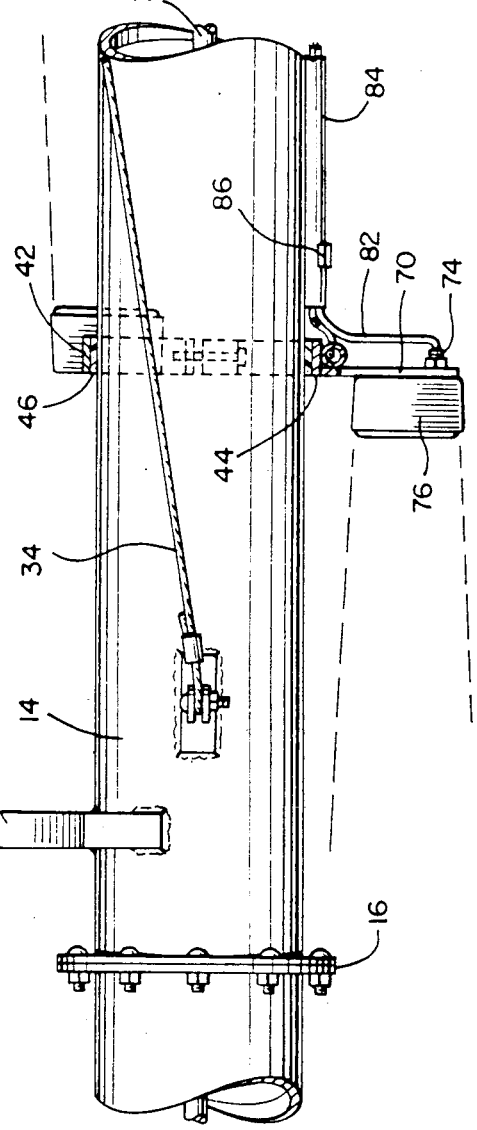

LIGHTING SYSTEM FOR GRAIN AUGER

BACKGROUND OF THE INVENTION

1. Field of the Invention

A lighting system for a grain auger which enables grain bins to be loaded at night. The lighting system includes a light bar mounted on an elongated grain elevator or auger in spaced relation to the grain bin being loaded and in spaced relation to the hopper end of the grain auger which receives grain from a grain conveying body mounted on a vehicle. The light bar includes light units which are directed toward the grain bin and the hopper end of the auger for effectively illuminating the work area associated with a grain storage bin or grain drying bin with the light units being adjustable for optimum positioning in relation to the work area with the adjustment of the light units also enabling the light to be directed to the open cover at the top of the bin or at the ladder on the side of the bin. The light bar is mounted by the use of a split clamp with cushioning material on the interior thereof to enable the light bar to be clamped to the grain auger housing without damage and in a secure and adjustable manner. The light units are standard halogen lights powered by the battery of a tractor or other suitable DC power source with the electrical conductors supplying electrical energy to the lights being positioned along the outer surface of the grain auger.

2. Description of the Prior Art

Grain augers are conventionally used to convey grain from a hopper at the lower end thereof adjacent ground level which receive grain from a vehicle grain body with the upper end of the auger discharging grain into a grain bin through a top which has been opened. During the relatively short harvest season, it frequently is desirable to continue loading the grain bins after dark in order to harvest the grain prior to arrival of approaching inclement weather conditions. Prior patents listed below disclose grain augers, attachments for grain augers and light supporting devices having general utility.

3,189,168
4,459,649
4,748,548
4,787,019
4,791,535
4,823,937

None of the above patents disclose a structure to support light units from the housing of a grain auger with the light units illuminating the work area associated with a grain auger including the hopper end in which grain is fed into a hopper from a vehicle grain body and the discharge end which discharges grain into a grain bin through an open upper end.

SUMMARY OF THE INVENTION

An object of the present invention is to provide a lighting system for a grain auger which includes a supporting structure attached to a grain auger intermediate the hopper end and discharge end with the support structure including light units supported therefrom which illuminate both the hopper end and discharge end of the auger as well as associated work areas.

Another object of the invention is to provide a lighting system for a grain auger in which the support structure is in the form of a crossbar clamped to the exterior of the grain auger housing with the crossbar including a light unit adjacent each end thereof and the crossbar being attached to the housing by a clamp structure which supports an additional light unit with at least one of the light units being directed toward the hopper end of the auger and at least one of the light units being directed toward the discharge end of the auger.

A further object of the invention is to provide a lighting system for a grain auger as set forth in the preceding objects in which the light units are adjustable to enable accurate positioning of the light units to maximize illumination of the desired work areas.

Still another object of the present invention is to provide a lighting system for a grain auger in accordance with the preceding objects in which the lighting units are powered by electrical conductors extending to the hopper end of the grain auger and operatively connected to a vehicle battery.

A still further object of the invention is to provide a lighting system for grain augers which is simple in construction, easy to attach to a grain auger, provides efficient illumination of farm operation work areas and is capable of being applied to other equipment having elongated boom sections in which illumination is desirable.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a transverse, sectional view, on an enlarged scale, illustrating the manner in which the light bar and lights are mounted on the auger.

FIG. 4 is a longitudinal, sectional view taken substantially upon a plane passing along section line 4—4 on FIG. 3 illustrating further structural details of the light bar mounting structure.

FIG. 5 is a exploded group perspective view illustrating the construction of the clamp and the manner in which the light bar is associated therewith.

DESCRIPTION OF THE PREFERRED EMBODIMENT

Figure 1:
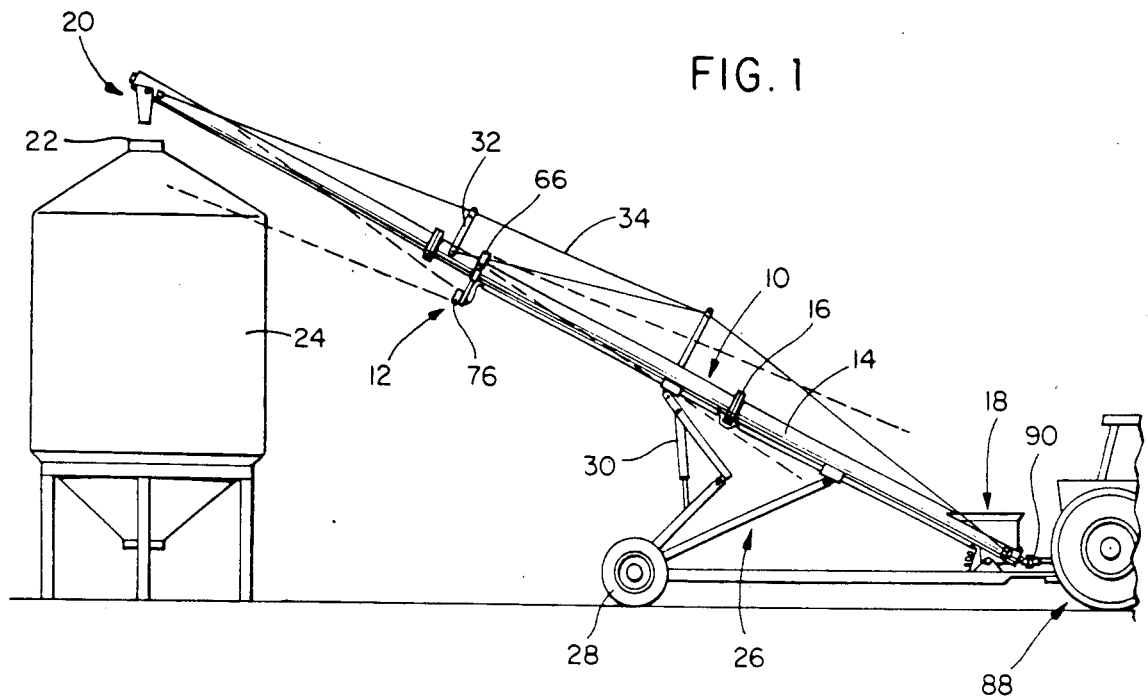
FIG. 1 is a side elevational view of a grain auger with the lighting system of the present invention incorporated thereon.
Figure 2:
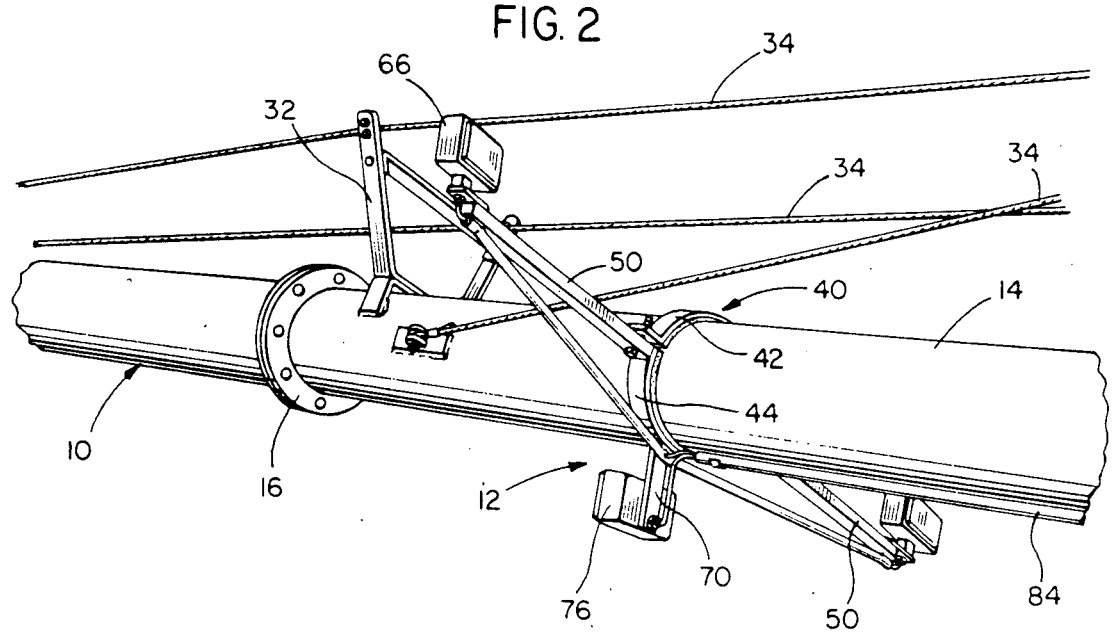
FIG. 2 is a fragmental perspective view illustrating the light bar with the lights mounted thereon illustrating the association of the components of the invention with the grain auger.

Referring now specifically to the drawings, a grain auger is generally designated by the reference numeral 10 with the lighting system 12 of the present invention mounted thereon. As illustrated, the grain auger 10 is of conventional construction and includes an elongated tubular housing 14 of sectional construction connected together by flange couplings 16 with a hopper structure generally designated by numeral 18 at one end thereof and a discharge pipe 20 extending vertically downwardly from the upper end thereof for discharging grain into an opening 22 in the upper end of a grain storage or drying bin 24. The grain auger 10 includes supporting frame structure 26 including ground engaging wheels 28 and a lift mechanism 30 to vertically position the housing 14 in the desired relationship with the hopper 18 being positioned against the ground surface and the discharge end 20 positioned above and in alignment with the opening 22. The auger 10 includes trusses 32 and tension cables 34 engaged with the trusses above the housing with the cables or tension members 34 cooperating with the trusses 32 and the housing 14 to form a support for the elongated cylindrical housing 14 and the screw auger 36 mounted therein. The grain auger in and of itself is of conventional construction and forms no part of the present invention except in the manner in which the lighting system 12 is associated therewith.

The lighting system 12 includes a clamp structure generally designated by reference numeral 40 which includes a pair of semi-circular or semi-cylindrical clamp members 42 and 44 each of which includes a lining 46 of cushioning material such as foam rubber, plastic or the like bonded to the interior of the clamp members 42 and 44. The semi-circular clamp member 42 includes laterally extending lugs or ears 48 at the ends thereof and the clamp member 44 is provided with a pair of laterally extending arms 50 at the ends thereof with the arms and the lugs 48 being interconnected by clamp bolts 52 which may be threaded into the lugs 48 as illustrated in FIG. 3 to securely and adjustably mount the clamp structure 40 on the auger housing 14 with the cushioning material 46 preventing the external surface of the housing 14 from being damaged or marred.

The clamp member 44 also includes a pair of tubular members 54 welded to the bottom of the clamp number 44 as at 56 with the tubular members 56 extending laterally outwardly in alignment with the arms 50 and in converging relation thereto with the outer ends of the members 54 being joined with and secured to the outer ends of the arms 50 as at 58 as illustrated in FIG. 3. The outer end of each arm 50 is provided with a bracket 60 in the form of a plate rigidly affixed to the upper surface of the tubular arm 50 as illustrated in FIG. 3. The outer end of the bracket 60 receives a supporting bolt 62 extending downwardly from the stem 64 of a light unit 66 which is in the form of a halogen light such as those commercially available for use as headlights on automobiles, trucks and similar vehicles. The bolt 62 receives a clamping nut 68 thereon which enables the light unit 66 to be swively adjusted about a vertical axis and then locked in position by tightening the clamp nut 68 in a conventional manner.

The lower clamp member 44 includes a depending bracket 70 welded thereto and which is in the form of a plate having an aperture 72 receiving a threaded stud or stem 74 on a light unit 76 which light unit is identical to the light unit 66 on each of the arms 50 with the light unit 76 being positioned below the auger housing 14 and the light units 66 being positioned generally in laterally spaced relation to the upper portion of the housing 14 as illustrated in FIG. 3 with the light units 66 facing in the direction of the hopper end 18 of the auger 10 and the single light unit 76 positioned below the housing 14 being directed toward the upper end of the grain bin 24 for illuminating the opening 22 therein and the discharge pipe 20 on the grain auger 10.

The tubular members 54 which cooperate with the arms 50 to form a triangular truss arrangement are cylindrical in cross section whereas the arms 50 are square tubular members. The tubular members 54 receive insulated electrical conductors 78 which are connected to the light units 66 and which extend to a point below the clamp member 44 where they exit from the tubular members 54 at openings 80. A similar electrical conductor 82 is connected to the light unit 76 and extends to a position in underlying relation to the housing 14 for entering a tubular member 84 extending along the undersurface of the tubular housing 14 and secured thereto by a retaining clip 86 with the conductors extending to the hopper end 18 of the auger for connection with a tractor battery (not shown) mounted in a conventional manner in a tractor generally designated by reference numeral 88 which may provide a power source to the grain auger through a power takeoff 90 with the light units 66 and 76 being supplied with electrical energy from the battery through a suitable connecting structure and switch structure.

The halogen flood lights are conventional and commercially available and have a dimension of 4"×6" although this may vary. Likewise, the length and size of the various components may vary depending upon installational requirements. The electrical connection includes a fuse holder as well as a male and female connector and the electrical system may include a 3-wire outdoor wire assembly extending from the hopper end of the auger to the light units. The components of the support bar are welded together using standard welding techniques to provide a rugged structure capable of long trouble-free use. The light units are mounted so that by loosening the nut on the threaded stem or stud, the light units can be swiveled 360° which provides the operator with the capability to direct the light on the open cover at the top of the bin or at the ladder on the side of the bin. The foam rubber or plastic lining material for the clamp members minimizes scuffing of the exterior surface of the grain auger and also prevents the light bar from slipping on the grain auger housing. The tractor could be provided with a control switch in the cab by which the three lights can be operated separately.

The lighting system of the present invention provides efficient illumination of both ends of an elongated grain auger and effectively extends the time period in which grain can be harvested and placed in a grain bin. Various farm vehicles including combines and trucks or wagons with grain bodies are provided with lights to enable operation after dark which is especially useful when a thunderstorm or other adverse weather conditions are approaching. However, vehicle lights such as on the vehicle having a grain body or on a tractor do not provide effective illumination of the work area associated with an elongated grain auger. Portable hand-held flashlights or similar portable lights are sometimes used to make certain that the grain is being properly discharged into the hopper from the vehicle grain body but such hand-held lights are relatively ineffective. When a truck with a grain body on it approaches the hopper end of the auger, the vehicle lights are facing away from the hopper when the vehicle is being backed into position to discharge grain from the grain body into the hopper end of the auger. Even the tractor PTO shaft presents a danger when in the dark and when the discharge door or chute is being operated to discharge grain into the hopper. All of the operations relating to loading a grain bin can be effectively carried out during daylight hours. The lighting system of this invention enables the same operations to be effectively and safely performed at night thereby greatly facilitating harvesting of grain at night as well as during the day thereby enabling farm operators to take complete advantage of weather conditions when they are favorable to harvesting.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A lighting system for a grain auger used in loading a grain bin by transferring grain loaded into the auger at a hopper end adjacent ground level to a discharge elevated end associated with an open area of a grain bin to enable the grain auger to be used at night by illuminating both ends of the grain auger, said lighting system comprising light means positioned intermediate the ends of the grain auger, support means stationarily mounting the light means on said auger intermediate the ends thereof, said light means including a light unit directed toward and illuminating the hopper end of the grain auger and a light unit directed toward and illuminating the discharge end of the grain auger.

2. A lighting system for a grain auger used in loading a grain bin by transferring grain loaded into the auger at a hopper end adjacent ground level to a discharge elevated end associated with an open area of a grain bin to enable the grain auger to be used at night by illuminating both ends of the grain auger, said lighting system comprising light means positioned intermediate the ends of the grain auger, support means stationarily mounting the light means on said auger intermediate the ends thereof, said light means including a light unit directed toward and illuminating the hopper end of the grain auger and a light unit directed toward and illuminating the discharge end of the grain auger, said support means including a split clamp encircling and clampingly mounted on the grain auger, said clamp including laterally extending support structure for supporting the light units, said support structure including a pair of diametrically opposed, horizontally disposed support bars attached to said clamp, one of the pair of light units being mounted on the end of one of said support bars and an additional light unit being mounted on the end of the other of said support bars and means swively attaching the light units to the support bars to enable adjustment of the lamp units mounted thereon for directing light beams to a selected area, said clamp including a depending support bar attached to said clamp in generally perpendicular relation to the horizontal support bars, the other of said pair of light units being mounted on said depending support bar and means swively connecting the light unit to the depending support bar to enable adjustment of the light unit thereon to illuminate a desired area.

3. The structure as defined in claim 2 wherein said light units mounted on the horizontal support bars are directed toward the hopper end of the grain auger and the light unit mounted on the depending support bar is directed toward the discharge end of the grain auger.

4. The structure as defined in claim 3 wherein said horizontally disposed support bars are positioned at the horizontal center of the clamp and reinforcing braces interconnecting the outer ends of the horizontal support bars and the clamp in circumferentially spaced relation to the connection between the clamp and horizontal support bars to rigidify the horizontal support bars.

5. The structure as defined in claim 4 wherein said split clamp includes resilient cushioning material lining the interior surface thereof to prevent the clamp from scuffing the exterior of the grain auger and preventing slippage of the clamp on the grain auger.

6. The structure as defined in claim 5 wherein said clamp is of cylindrical configuration for clamping engagement with a cylindrical housing of the grain auger.

7. The structure as defined in claim 6 wherein each of the lamp units includes a conductive wire connected thereto and means securing the conductive wires to the grain auger with the conductive wires extending longitudinally to the hopper end of the grain auger for connection with a battery in a tractor for supplying electrical energy to the light units, said electric conductors being insulated from the grain auger and enabling energization of the light units from a tractor and enabling control of the light units from ground surface.

8. In combination, an elongated grain auger disposed in inclined position and having remote ends requiring observation for safe operation with the lower end of the auger having a hopper and drive unit generally at ground level for receiving grain from a vehicle load body and the upper end of the auger associated with an access opening in a grain bin, a lighting system for said auger for illuminating both ends thereof to enable safe operation thereof at night, said lighting system comprising stationary support means attached to said auger intermediate the ends thereof and separate light means mounted rigidly on said support means with one of said light means being directed toward the lower end of the auger and the other light means being directed toward the upper end of the auger to illuminate both ends thereof.

9. The combination as defined in claim 8 wherein said support means includes a generally horizontally disposed light bar, one of said light means including a pair of light units mounted at the outer ends of the support bar, said support structure also including a generally vertically extending support bar, the other light means including a light unit mounted on the vertical support bar, the light units on the horizontal bar being directed toward the lower end of the auger and the light unit on the vertical support bar being directed toward the upper end of the auger.

10. The structure as defined in claim 9 together with means adjustably supporting the light units from the support bars to enable the light units to be initially adjusted for optimum positioning in directing light beams toward the ends of the auger.

11. A lighting system for a grain auger used in loading a grain bin by transferring grain loaded into the auger at a hopper end adjacent ground level to a discharge elevated end associated with an open area of a grain bin to enable the grain auger to be used at night by illuminating both ends of the grain auger, said lighting system comprising light means positioned intermediate the ends of the grain auger, support means mounting the light means on said auger intermediate the ends thereof, said light means including a light unit directed toward and illuminating the hopper end of the grain auger and a light unit directed toward and illuminating the discharge end of the grain auger, said support means including at least a pair of support member rigidly mounted on said grain auger, said light units being rigidly mounted on the support members and directing a beam of light generally longitudinally of the grain auger toward the hopper end and discharge end for illuminating the ends of the grain auger and the area surrounding the hopper including portions of a vehicle body discharging grain into the hopper and illuminating an access opening in the grain bin and adjacent area of the grain bin.

12. The structure as defined in claim 11 wherein said support member for the light unit illuminating the hopper end of the auger includes a generally horizontally disposed support bar extending laterally from opposite sides of the grain auger with the light unit including a light at the opposite outer ends of the support bars oriented in spaced relation to the auger for illuminating the hopper end of the auger and adjacent areas.

13. The structure as defined in claim 12 wherein said support member for the other light unit is a support bar extending laterally from the grain auger in perpendicular relation to the horizontal support bars with the other light unit being mounted thereon in spaced relation to the grain auger for illuminating the upper end of the grain auger and adjacent area of the grain bin.

* * * * *